United States Patent [19]
Evans et al.

[11] Patent Number: 5,861,581
[45] Date of Patent: Jan. 19, 1999

[54] EQUALIZER HANGER SYSTEM FOR ON-BOARD WEIGHING

[75] Inventors: Peter G. Evans, Tauranga, New Zealand; Keith W. Reichow, Kent, Wash.

[73] Assignee: Stress-Tek, Inc., Kent, Wash.

[21] Appl. No.: 763,335

[22] Filed: Dec. 11, 1996

[51] Int. Cl.$^6$ .................................................. G01G 19/08
[52] U.S. Cl. ........................ 177/136; 177/137; 177/138
[58] Field of Search .................................. 177/136, 137, 177/138

[56] References Cited

U.S. PATENT DOCUMENTS

| 2,181,277 | 11/1939 | Labbe | 265/40 |
|---|---|---|---|
| 3,841,652 | 10/1974 | Higginson | 280/104.5 B |
| 4,042,049 | 8/1977 | Reichow et al. | 177/137 |
| 4,789,033 | 12/1988 | Dohrman | 177/137 |
| 4,884,644 | 12/1989 | Reichow | 177/137 |
| 4,884,652 | 12/1989 | Reichow | 177/137 |
| 4,969,529 | 11/1990 | Reichow | 177/137 |
| 5,578,798 | 11/1996 | Nuyts | 177/136 |

OTHER PUBLICATIONS

Hutch Suspension System with Electronic Weighing System (3 sheets, pp. 21, 22, 27).
Eldec On–Board Electronic Scale (2 sheets, including drawings).

Primary Examiner—Lincoln Donovan
Assistant Examiner—Anh Mai
Attorney, Agent, or Firm—Jensen & Puntigam, P.S.

[57] ABSTRACT

The equalizer hanger system includes a torque arm bracket which is secured to the vehicle frame and depends downwardly therefrom. The bracket includes means for receiving one end of a torque arm, the other end thereof being connected to an axle of the vehicle. A beam-type load cell for measuring the force of a vehicle load is bolted to the undersurface of the torque arm bracket, and an equalizer bracket is bolted to the lower surface of the load cell. A conventional equalizer member is mounted to the equalizer bracket, with the equalizer adapted to receive portions of the suspension system for the vehicle.

16 Claims, 3 Drawing Sheets

EQUALIZER HANGER SYSTEM FOR ON-BOARD WEIGHING

TECHNICAL FIELD

This invention relates generally to the art of vehicle on-board weighing systems, but more particularly concerns a weighing system for use in vehicles having multi-axle suspension systems which include an equalizer member.

BACKGROUND OF THE INVENTION

U.S. Pat. No. 4,969,529, which is owned by the same assignee as the present invention, discloses a dual-axle equalizer hanger system used in a vehicle on-board weighing system. In one of the embodiments which has been commercially implemented, a force transducer is secured to a facing surface of the equalizer hanger to measure the weight of the vehicle load. One of the disadvantages of that system is the expense required for the manufacture and/or inventory of the large number of possible equalizer hanger systems. In addition, if a force transducer fails, the entire equalizer hanger assembly must be cut off the vehicle and a new one welded on.

The basic system disclosed in the '529 patent, however, was an improvement over previous systems in which portions of the frame of the vehicle had to be cut away and then replaced by a beam-type load cell, to which the equalizer hanger was then secured. This was an even more expensive and time-consuming process.

In order to satisfy the demand for a simple retrofit weighing system for use with a load equalizer suspension assembly, the system of the present invention was designed. The present design allows the use of conventional load cells and conventional equalizer members, as well as permitting fast and convenient replacement of existing load cells which may become defective.

DISCLOSURE OF THE INVENTION

Accordingly, the present invention is an on-board weighing system for weighing loads on a vehicle, for use with a suspension system on such vehicles with multiple axles, comprising: a torque arm bracket which is mounted to the frame of the vehicle for receiving a torque arm portion of the suspension, the torque arm extending from a vehicle axle to the torque arm bracket; a load cell for measuring vehicle loads, mounted to the torque arm bracket, wherein torque arm loads do not go through the load cell; an equalizer support bracket mounted to the load cell; and an equalizer member mounted to the equalizer support bracket, including means for receiving a portion of the suspension of the vehicle, wherein vertical forces produced by the vehicle load on the equalizer member, acting through the suspension system, are measured by the load cell.

In one variation, the load cell is replaced by a similar sized support member, such as a steel block. In such a case, the installed system is "scale-ready" for conversion when desired by replacing the support member with a load cell. In another variation, the torque arm bracket includes a base member portion which is mounted to the frame of the vehicle. The base member includes a cutout portion. The load cell portion of the weighting system is mounted to the frame of the vehicle within the cutout portion, or alternatively to a mounting block which is mounted to the frame of the vehicle.

BEST MODE FOR CARRYING OUT THE INVENTION

Figure 1:
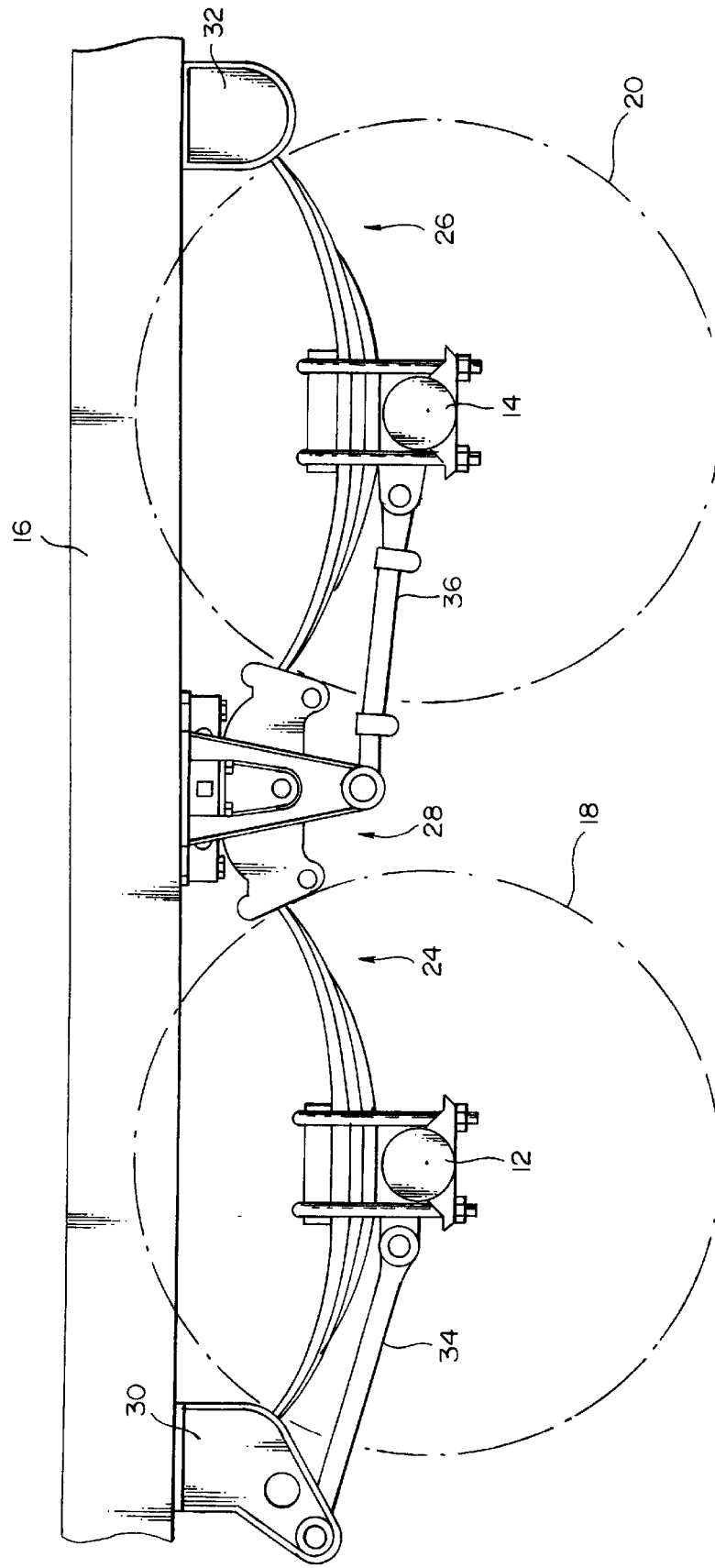
FIG. 1 is a general schematic view of the equalizer hanger system of the present invention pictured as part of an on-board weighing system on a vehicle.

FIG. 1 shows for illustration one set of dual axles 12, 14, which are shown supporting a frame bed 16 which could, for example, be a part of a trailer in a truck-trailer combination or part of a dolly for a trailer. Other arrangements/combinations are also possible. All of these are generally referred to herein as vehicles. The wheels for the dual axle set are shown in phantom at 18 and 20. The dual axles 12, 14, shown could be located at the front or rear of the trailer. Supporting the two axles is a conventional suspension system comprising a set of two spring assemblies 24, 26.

The spring assemblies 24, 26 extend between a load equalizing assembly shown generally at 28, which distributes the load between the two axles 12, 14 and front and rear hanger assemblies 30 and 32. Typically, the front and rear hangers 30 and 32 are bolted or welded to frame 16. Connected between axle 12 and front hanger 30 is a torque arm 34, while connected between rear axle 14 and load equalizing assembly 28 is a torque arm 36. The purpose of the torque arms is to maintain an equal distance between the axle and the hanger systems across the bed of the truck-trailer. FIG. 1 and the above description are directed to a two axle arrangement. It should be understood that the present invention is applicable to other axle arrangements as well, such as three axle units.

The above description is in general applicable to well-known prior art as well. In the prior art, the load equalizing assembly includes what is generally referred to as an equalizer hanger member which, like the front and rear hangers, is secured by bolting or welding to the frame of the vehicle, with an equalizer member then being rotatably mounted by a central pin element to the equalizer hanger. Two spring suspension assemblies, similar to those shown in FIG. 1, are then secured to the opposing ends of the equalizer member and to the front and rear hangers, respectively. In the past, in order to modify the above-described system to accommodate conventional beam-type load cells for on-board weighing systems, a portion of frame 16 is cut out and the load cell welded into place between the truck frame and the equalizer hanger. In another method, the equalizer hanger system is first welded to a load cell, and then the load cell is attached to the frame of the vehicle.

As indicated above, however, this procedure is expensive and time-consuming. It is particularly difficult to retrofit truck-trailer combinations to accommodate such a system. As discussed above, one commercial solution to this difficulty is the use of a force transducer secured to a facing surface of the equalizer hanger. The present invention, however, is a novel load equalizing assembly which uses a bolt-on load cell and can also use a variety of equalizer support structures or torque arm support structures.

Figures 2, 3:
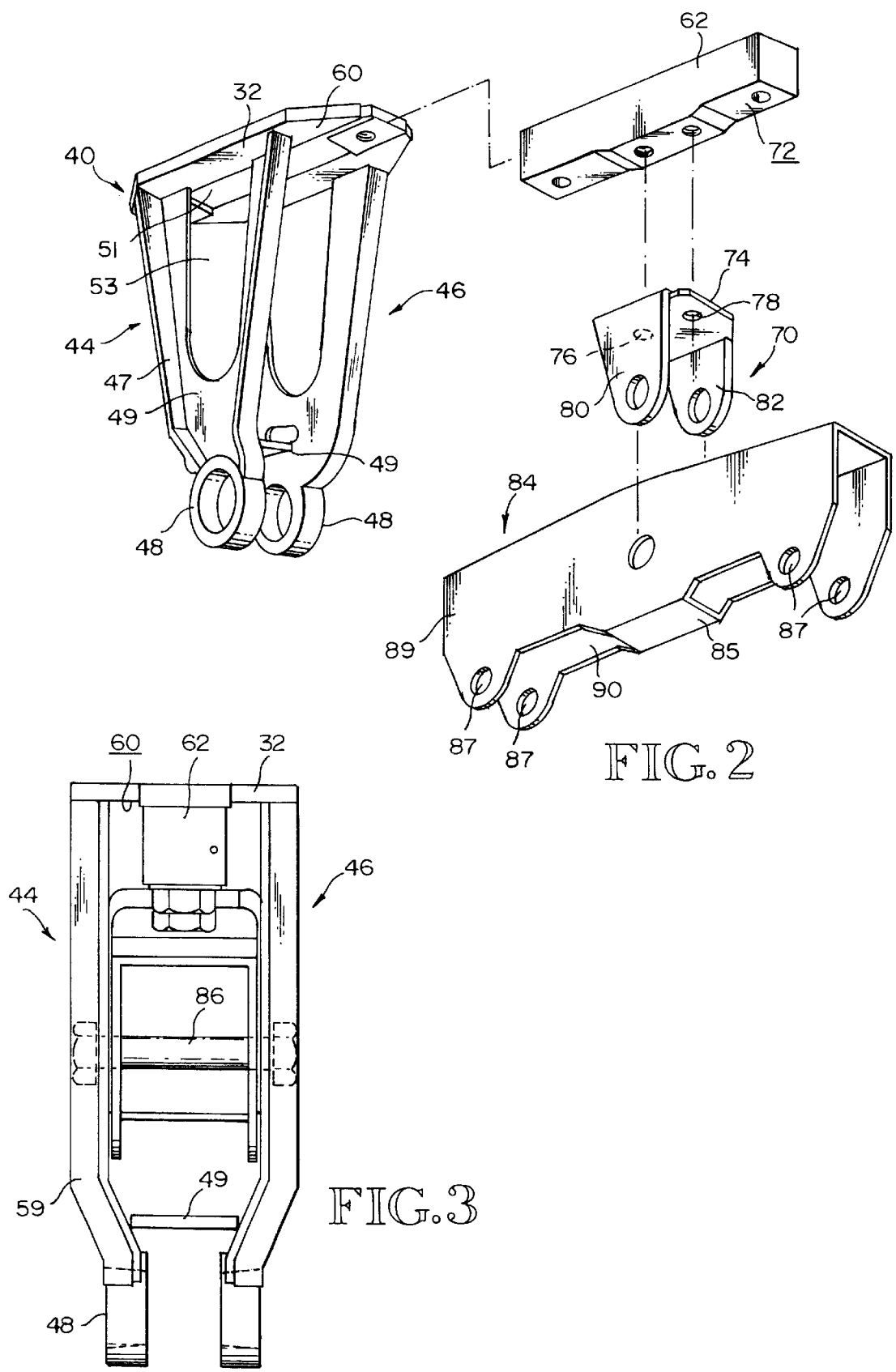
FIG. 2 is an exploded schematic view of the equalizer hanger system of the present invention, including a torque arm bracket, a load cell, an equalizer bracket and an equalizer member.
FIG. 3 is an end view of the system of FIG. 2.

FIGS. 2 and 3 show the equalizer assembly of the present invention. This assembly includes a torque arm bracket 40. Torque arm bracket 40 includes an upper mounting base plate 32 of steel approximately 15 inches long and six inches wide, with each of the corners of the plate being angled. Extending downwardly from plate 32 from the opposing longitudinal edges thereof are two identical wing-like portions 44 and 46. Each wing-like portion at its intersection with the mounting plate is approximately eight inches wide. They depend downwardly for a distance of approximately 15 inches, terminating in a ring portion 48, adapted to receive one end of a torque arm between them. Ring portion 48 has an opening of approximately 1.8 inches in diameter in the embodiment shown. A bracing plate 49 extends between the two wing-like portions just above the respective ring portions.

The side edges of each wing-like portion angle inwardly from plate 32 to ring portion 48, i.e. each wing-like portion narrows slightly in width from plate 32 to ring portion 48, as shown most clearly in FIG. 2. Each wing-like portion is basically a steel plate 49 approximately ¼ inch thick with an outwardly projecting lip 47 (90° to plate) along the peripheral edge thereof. Steel plate 49 includes a cutout part 53 therein which extends longitudinally from an upper end 51 of plate 49 adjacent mounting plate 32 for a distance of approximately nine inches. At the upper end thereof, cutout part 53 is approximately four inches wide. Cutout part 53 then angles or tapers slightly inwardly, terminating in a semi-circle having a radius of approximately 1.6 inches.

As indicated above, ring portion 48 is adapted to connect with one end 57 of a torque arm which extends from an axle of the trailer. End 57 of torque arm 36 fits between the two opposing ring-like portions, with a bolt 55 extending through the two ring portions and an opening in end 57 of the torque arm. At the base of each wing-like portion, adjacent mounting plate 32, the two wing-like portions are separated by a space of approximately four inches. This spacing remains the same for a length of approximately ten inches, at which point 59 the two wing-like portions angle inwardly for a short distance before terminating in the respective ring portions, where the distance between the two wing-like portions is approximately two inches.

Bolted to undersurface 60 of mounting plate 32 of each wing-like portion is a conventional beam-type load cell 62. This beam load cell, for instance, could be a "Vulcan" shear beam load cell manufactured by the assignee of the present invention, or it could be other beam-type load cells, including a bending beam load cell. Load cell 62 is in the embodiment shown bolted to the undersurface 60 by means of two bolts located at spaced points near the respective ends of load cell 62. It is important that load cell 62 can be a conventional, commercially available load cell, eliminating any requirement of having to place strain gauges on selected parts of the equalizer assembly system itself, such as the equalizer member or torque arm or the equalizer hanger.

An equalizer bracket 70 is connected to the lower surface 72 of the load cell. Equalizer bracket 70 includes a base plate 74 which is approximately 6.25 inches long and four inches wide in the embodiment shown. The corners of base plate 74 are rounded. Base plate 74 includes two openings 76 and 78 near the opposite ends thereof. Openings 76, 78 accommodate bolts which secure the equalizer bracket to the undersurface of the load cell. Extending downwardly from each longitudinal edge of base plate 74 are two side plates 80 and 82. Each side plate is approximately 3.5 inches wide at the upper end thereof (at its intersection with base plate 74) and approximately six inches long. The side edges of each side plate extend straight for approximately two inches and then taper slightly inwardly, ending in a semi-circle having a radius of approximately 1.4 inches. In the embodiment shown, equalizer bracket 70 is made from steel, with the base plate and the side plates being approximately ½ inch thick. The side plates are typically welded to base plate 74, but the bracket could be cast or fabricated as one piece as well. Each side plate 80 and 82 has, respectively, an opening near the lower free end thereof, with a diameter of approximately one inch.

Positioned between side plates 80 and 82 is an equalizer member 84. Equalizer member 84 is rotatable in the bracket about a bolt or pin 86. Equalizer member 84 is a conventional element which can have various configurations. It is generally U-shaped in lateral cross-section, approximately 3½ inches wide, with side walls 89, 90 being connected at the open side by a narrow center portion 85. At each end of the equalizer member are openings 87 in the sidewalls through which a bolt extends. One end of each of the spring suspensions, respectively, fits into the opposing ends of the equalizer member. The bolt retains the spring ends in the equalizer, preventing the springs from dropping out of the equalizer when the wheel moves away from contact with the road.

Figure 4:
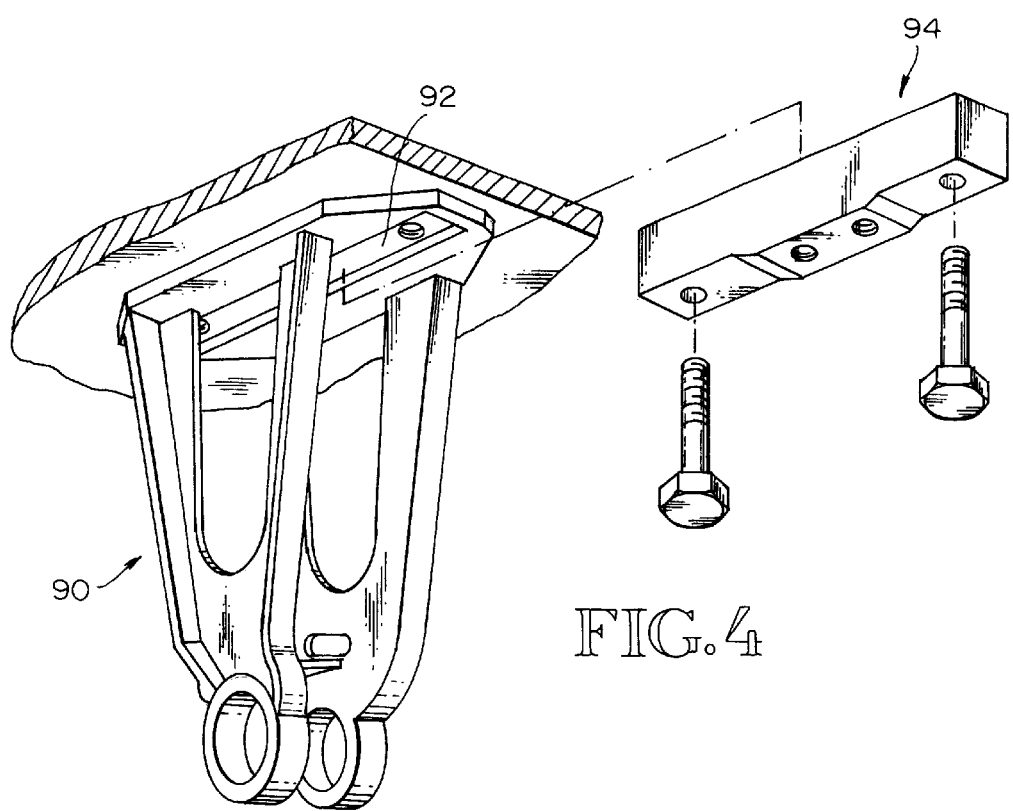
FIG. 4 a schematic view of another embodiment of the present invention.

FIG. 4 shows a variation of the embodiment of FIGS. 2 and 3. The torque arm bracket 90, which is mounted to the frame of the vehicle, includes an opening or cutout region 92 therein. A load cell 94 is then positioned in the cutout section and connected to the frame, either directly or with a mounting block. The mounting block will typically be welded to the frame. Both of these embodiments are contemplated as the load cell being mounted to the frame of the vehicle. An equalizer support bracket is then connected to the underside of the load cell, like the embodiment of FIGS. 2–3.

The above-described assembly has significant advantages over existing equalizer assemblies. First, the described equalizer assembly can be connected to the frame of the vehicle like existing equalizer assemblies, such as by welding or bolting, without any frame modifications. The torque arm bracket portion of the assembly may be welded to the vehicle frame without a load cell, which is then conveniently bolted on thereafter. This permits the use of normal welding procedures without the need for special precautions to prevent overheating of an in-place load cell.

In addition, the equalizer assembly can be installed on a vehicle at the time of manufacture with a block of steel instead of a load cell, if a weighing capability is not initially desired. Such a system is "scale-ready", i.e. replacement of the block of steel with a load cell will result in an operative weighing system. The resulting suspension system is typically not significantly more expensive than a conventional center hanger suspension system. As indicated above, the system is scale-ready and can be converted readily at a later date if so desired.

If a load cell breaks or comes apart from the torque arm bracket, the equalizer member itself remains confined by the two wing-like portions of the torque arm bracket, which will hold the system together until the load cell can be replaced. Still further, the system is easy and convenient to install, convert or service, which is a significant advantage over existing equalizer hanger assemblies, while in addition, the system can accommodate a variety of conventional load cells, as well as equalizer members and equalizer hangers, thus providing the system a significant amount of flexibility.

Hence, the equalizer assembly shown and described herein, in particular the combination of the torque arm bracket, the load cell arrangement and the equalizer bracket, results in a practical and relatively inexpensive equalizer system which is quite flexible in application and performs not only the desired load equalizing function but also a weighing function as well.

Although a preferred embodiment of the invention has been disclosed herein for illustration, it should be understood that various changes, modifications and substitutions may be incorporated in such embodiment without departing from the spirit of the invention, which is defined by the claims as follows:

What is claimed is:

1. An on-board weighing system for weighing loads on a vehicle, for use with a suspension system on such vehicles with multiple axles, comprising:

a torque arm bracket which includes a base portion and two opposing side portions which depend downwardly from opposing side edges of the base plate portion, the base plate portion being mounted to the frame of the vehicle, the torque arm bracket including means for receiving a torque arm portion of the suspension, wherein the torque arm extends from a vehicle axle to the torque arm bracket;

a load cell for measuring vehicle loads, mounted to an underside of the base portion of the torque arm bracket;

an equalizer support bracket mounted to the load cell; and an equalizer member mounted to the equalizer support bracket, including means for receiving a portion of the suspension of the vehicle, wherein vertical forces produced by the vehicle load act on the load cell through the equalizer, and do not act on the depending side portions of the torque arm bracket.

2. An apparatus of claim 1, wherein the suspension system includes a rear hanger, a front hanger and two spring assemblies, and wherein one spring assembly extends between the rear hanger and the equalizer member and the other spring assembly extends between the equalizer member and the front hanger.

3. An apparatus of claim 1, wherein the suspension system includes front and rear hangers and three spring assemblies and wherein one spring assembly extends between the rear hanger and the equalizer member, the second spring assembly extends between the equalizer member and a second equalizer member, and the third spring assembly extends between the second equalizer member and the front hanger.

4. An apparatus of claim 1, including means for providing an electrical signal indicative of the force on the load cell caused by the load on the vehicle.

5. An apparatus of claim 1, wherein the equalizer support bracket extends downwardly from the load cell.

6. An apparatus of claim 1, wherein the equalizer support bracket is separate from the load cell.

7. An apparatus of claim 1, wherein the equalizer support bracket, the load cell and the torque arm bracket are so connected and configured that the equalizer bracket is retained by the torque arm bracket in the event of breakage of the load cell or separation thereof from the torque arm bracket.

8. An apparatus of claim 1, wherein the load cell is mounted to an undersurface of the torque arm bracket.

9. An apparatus of claim 1, wherein the equalizer bracket extends below said load cell.

10. An apparatus of claim 1, wherein the equalizer bracket includes a base plate and two side plates which extend from the opposing edges of the base plate, wherein the side plates have openings near a free end thereof, for receiving a fastening member therethrough for securing the equalizer member to the equalizer bracket.

11. An apparatus of claim 1, wherein the load cell is a shear beam load cell.

12. An apparatus of claim 1, wherein the load cell is a bending beam load cell.

13. A scale-ready load equalizing system for use with a suspension system on such vehicles with multiple axles, comprising:

a torque arm bracket having a base portion and two opposing side portions which depend downwardly from opposing side edges of the base portion, the base portion being mounted to the frame of the vehicle, the torque arm bracket including means for receiving a torque arm portion of the suspension, the torque arm extending from a vehicle axle to the torque arm bracket;

a support member mounted to the base portion of the torque arm bracket in such a manner that the support member is readily replaceable by a load cell without disrupting the mounting of the torque arm bracket to the frame;

an equalizer support bracket mounted to the support member; and an equalizer member mounted to the equalizer support bracket, including means for receiving a portion of the suspension of the vehicle, the replacement of the support member by a load cell providing a capability for measuring vehicle loads.

14. An apparatus of claim 13, wherein the equalizer bracket extends below said support member.

15. An apparatus of claim 13, wherein the equalizer bracket includes a base plate and two side plates which extend from the opposing edges of the base plate, wherein the side plates have openings near a free end thereof, for receiving a fastening member therethrough for securing the equalizer member to the equalizer bracket.

16. An apparatus of claim 13, wherein the equalizer bracket is integral with the support member.

* * * * *